United States Patent [19]

Kawabe et al.

[11] Patent Number: 4,788,122
[45] Date of Patent: Nov. 29, 1988

[54] PRODUCTION OF POLYESTER AND ELECROPHOTOGRAPHIC TONER CONTAINING THE SAME

[75] Inventors: Kuniyasu Kawabe; Shinichiro Yasuda; Hideyo Nishikawa, all of Wakayama, Japan

[73] Assignee: Kao Corporation, Tokyo, Japan

[21] Appl. No.: 838,382

[22] Filed: Mar. 11, 1986

[30] Foreign Application Priority Data

Mar. 14, 1985 [JP] Japan .................................. 60-51310
Mar. 14, 1985 [JP] Japan .................................. 60-51309
May 31, 1985 [JP] Japan .................................. 60-117787

[51] Int. Cl.$^4$ .............................................. G03G 9/08
[52] U.S. Cl. ..................................... 430/109; 430/137; 430/904
[58] Field of Search ........................ 430/109, 904, 137

[56] References Cited

U.S. PATENT DOCUMENTS 4,460,672 7/1984 Gruber et al. ....................... 430/110
4,556,624 12/1985 Gruber et al. ................... 430/109 X

FOREIGN PATENT DOCUMENTS 171345 10/1982 Japan ................................... 430/108

Primary Examiner—J. David Welsh
Attorney, Agent, or Firm—Birch, Stewart, Kolasch & Birch

[57] ABSTRACT

A polyester for use as an electrophotographic toner composition is obtained by copolycondensation of (a) a diol component of polyoxyalkylene-bis(4-hydroxyphenyl)propane and (b) an acid component, improved by incorporating into the acid component a copolymer of styrene or a derivative thereof and a carboxylic vinyl monomer. A copolymer of an unsaturated aliphatic hydrocarbon and an unsaturated carboxylic acid and a polymer and copolymer of an unsaturated carboxylic acid may be used. The toner is improved in the prevention of off-set in the fixation step.

15 Claims, No Drawings

PRODUCTION OF POLYESTER AND ELECROPHOTOGRAPHIC TONER CONTAINING THE SAME

FIELD OF THE INVENTION

The present invention relates to a process for producing a binder resin. More particularly, the present invention relates to a process for producing a binder resin particularly useful for the production of a developer composition for developing an electrostatic image in electrophotography, electrostatic recording and electrostatic printing.

BACKGROUND OF THE INVENTION

A conventional electrophotographic process comprises the steps of uniformly charging a photoconductive insulating layer, exposing this layer, eliminating an electric charge from the exposed portion to form an electric latent image, applying a colored, charged, fine powder called a toner to the latent image to visualize the same (developing step), transferring the obtained visible image onto a transfer material such as a transfer paper (transfer step) and permanently fixing the image by heating, compression or another suitable fixing method (fixing step) as described in U.S. Pat. Nos. 2,297,691 and 2,357,809.

Thus, the toner must have functions required not only in the developing step but also in the transferring and fixing steps.

Generally, a toner is deteriorated by mechanical friction due to shearing or impact force applied thereto while thousands or more of copies are produced by a mechanical treatment carried out in a developing device. Though the problem of the deterioration of the toner can be solved by using a high-molecular tough resin resistant to the mechanical friction, this type of resin generally has a high softening point and, therefore, sufficient fixing is impossible by a non-contact fixing method such as an oven fixing method or radiant fixing method with infrared rays due to poor thermal efficiency thereof. Further, when the resin is used in a contact fixing method such as a usual heat roller fixing method, a high temperature is required of the heat roller so as to effect the fixing sufficiently and, therefore, problems such as damage to the fixing device, curling of the paper an increase in energy consumption are present in this method, since a high thermal efficiency is obtained and, in addition, when this type of resin is used, the production efficiency of the toner by finely pulverizing the resin is reduced seriously. Thus, a binder resin having an excessively high degree of polymerization and an excessively high softening point cannot be used. The heat roller fixing method has been employed widely, ranging from low-speed to high-speed fixing systems, because a remarkably high thermal efficiency is obtained as the surface of the heat roller is pressed against a toner image surface of the sheet to be fixed. However, a so-called offset phenomenon is caused when the heat roller is brought into contact with the toner image surface, since the toner adheres to the surface of the heat roller and it is then transferred onto the subsequent transfer paper. To prevent this phenomenon, the surface of the heat roller is treated with a material having excellent releasing properties such as a fluororesin and, in addition, a releasing agent such as silicone oil is applied to the surface of the heat roller to inhibit the offset phenomenon completely.

However, this process in which silicone oil, etc. are used is not preferred, since it necessitates a large fixing device to cause cost increases and a complicated operation.

Though a process for preventing the offset phenomenon by widening the molecular weight distribution of the binder resin is disclosed in Japanese Patent Publication No. 6895/1980 and Laid-Open No. 98202/1981, the degree of polymerization of the resin is increased and a high fixing temperature is necessitated in this process.

Though a further improved process for preventing the offset phenomenon by asymmetrizing or crosslinking the resin is disclosed in Japanese Patent Publication No. 493/1982 and Laid-Open Nos. 44836/1975 and 37353/1982, the problem of the fixing temperature has not yet been solved.

The practical operation temperature ranges from the minimum fixing temperature to a hot offset temperature, since the minimum fixing temperature lies between a cold offset temperature and the hot offset temperature. Therefore, by lowering the minimum fixing temperature as far as possible and elevating the minimum hot offset temperature as far as possible, the practical fixing temperature can be lowered and the practical operation temperature range can be widened. In addition, energy saving, fixing at a high speed and prevention of curling of the paper can be attained. Further, double copying can be effected by this technique without any problems to obtain advantages such as an intelligent copier, mitigation of the accuracy, and temperature control of the fixing device.

Resins and toners having excellent fixing properties an offset resistance are always in demand.

Though it is known that when a styrene binder resin is used a paraffin wax, a low-molecular polyolefin or the like is used as an offset inhibitor for attaining the above-mentioned purposes as disclosed in Japanese Patent Laid-Open Nos. 65232/1974, 28840/1975 and 81342/1975, this process also has problems in that the intended effect cannot be obtained when the amount of the offset inhibitor is insufficient and the deterioration of the developer is accelerated when the amount is excessive. When a polyester resin is used, the offset inhibitor is substantially ineffective and when it is used in a large amount, the deterioration of the developer is also accelerated.

Polyester resins have essentially excellent fixing properties and sufficient fixing is possible even by a non-contact fixing process as disclosed in U.S. Pat. No. 3,590,000, but they could not be used easily in the heat roller fixing process because of the offset phenomenon. As described in Japanese Patent Laid-Open Nos. 44836/1975, 37353/1982 and 109875/1982, even when the offset resistance of the polyester resin is improved with a polybasic carboxylic acid, the offset resistance is still insufficient for practical use or, even if it is sufficient, an inherent low-temperature fixing property of the polyester resin is sacrifice. The pulverizability thereof is the toner-forming step is very poor and problems are posed also in the production of the developing agent.

SUMMARY OF THE INVENTION

Accordingly, one object of the present invention is to overcome the disadvantages associated with the prior art.

Another object of the present invention is to provide a binder resin for a developer, which exhibits excellent kneadability and pulverizability in the production of the developer and which can be fixed at a low fixing temperature while offset is prevented without necessitating the application of an offset inhibitor in the heat roller fixing process.

Yet another object of the present invention is to provide a binder resin for a blocking-free developer having a high fluidity and a long life (resistance to deterioration).

Still another object of the present invention is to provide a binder resin for use as a toner in the dry development in electrophotography, which resin can be charged with a negative, strong, uniform charge. The toner can form a clear, fog-free image. The present toner is free of the above shown defects and is not influenced substantially by environmental humididty. Moreover, it has an excellent durability and can have a negative frictional charge.

An additional object of the present inventin is to provide a process for producing a binder resin to be used in the production of a developer for forming a transparent, clear, colored image.

A further object of the present invention is to provide a process for producing a binder resin to be used in the production of a developer capable of inhibiting adhesion with a file when it is kept in the file and keeping the image from migrating to a film.

The present invention provides a process for producing a polyester by copolycondensing:

(a) a diol component of the formula (I):

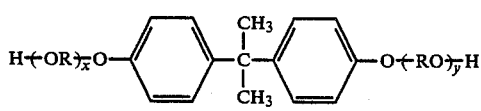

wherein R is an ethylene or propylene group and x and y are each an integer of at least 1, the sum of x and y being 2 to 7 on the average, with (b) an acid component of a polycarboxylic acid, an anhydride thereof or a lower alkyl ester thereof, containing (II) a polycarboxylic copolymer of a styrene compound selected from alpha-methylstyrene and a compound of the formula (IIa):

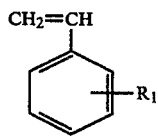

wherein R1 is hydrogen or a hydrocarbon group having 1 to 3 carbon atoms, and a carboxylic group-having a vinyl monomer of the formula (IIb), an anhydride thereof or a lower alkyl ester thereof:

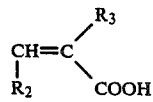

wherein R2 and R3 are each hydrogen, methyl or carboxyl group or (IV) a copolymer of an unsaturated aliphatic hydrocarbon (IVa) having 2 to 21 carbon atoms and an unsaturated carboxylic acid (IVb) or (V) a polymer or compolymer of an unsaturated carboxylic acid (IVb).

In other words, the polyester of the present invention is prepared from (a) the diol component of the formula (I) and (b) the acid component. The acid component essentially comprises (II) the polycarboxylic copolymer, (IV) the copolymer or (V) the polymer or copolymer.

In the present invention, the lower alkyl group preferably has 1 to 4 carbon atoms.

In addition, the present invention provides a polyester which has been obtained in the above defined preparation process. The polyester is useful as a binder resin for the electrophotographic toner. Accordingly, the toner composition is also covered in the present invention.

Examples of the diol components (a) in the present invention include polyoxypropylene (2.2)-2,2-bis(4-hydroxyphenyl)propane, polyoxypropylene-(3.3)-2,2-bis (4-hydroxyphenyl)propane, polyoxyethylene(2.0)-2,2-bis(4-hydroxyphenyl)propane, polyoxypropylene(2.0)-polyoxyethylene(2.0)-2,2-bis(4-hydroxyphenyl)propane and polyoxypropylene(6)-2,2-bis(4-hydroxyphenyl)propane.

If necessary, the polyol component may contain up to about 10 % by mole based on the polyol component, of other polyols such as polyoxypropylene(12)-2,2-bis(4-hydroxyphenyl)propane, polyoxyphenylethylene(3)-2,2-bis(4-hydroxyphenyl)propane, ethylene glycol, diethylene glycol, propylene glycol, triethylene glycol, tetramethylene glycol, pentamethylene glycol, hexamethylene glycol, heptamethylene glycol, octamethylene glycol, nonamethylene glycol, decamethylene glycol, neopentyl, glycol, p-xylylene glycol, m-xylylene glycol, 1,4-cyclohexanedimethanol, 1,4-cyclohexanediethanol, 1,4-cyclohexanediol, 1,3-cyclohexanedimethanol, glycerol, polyoxyethylene(6) glycerol and polyoxypropylene(12) pentaerythritol. However, when a compound having a high steric hindrance, such as polyoxyphenylethylene-(3)-2,2-bis(4-hydroxyphenyl)propane, is used, the reaction does not proceed easily. When a resin produced from a highly hydrophilic polyol such as glycerol or polyoxyethylene(6) pentaerythritol is used, the image-forming capacity of the developer is reduced. Thus, care should be taken to avoid these effects.

The compounds of the formula (IIa) herein include, for example, styrene, methylstyrene, ethylstyrene and propylstyrene.

Examples of the compounds of the formula (IIb) herein include maleic, fumaric, acrylic, methacrylic and itaconic acids. They may be in the form of either their anhydrides or lower alkyl esters. The lower alkyl group herein indicates that the alkyl group in the alkyl ester has such a number of carbon atoms that it does not disturb the copolymerization of the compound of the formula (IIa) with the compound of the formula (IIb).

In the copolymerization, the compound of the formula (IIa) is used in an amount preferably 1 to 5 mol per mol of the compound of the formula (IIb).

Examples of the polybasic carboxylic acids (II) used in the present invention are shown below. It is to be noted that those in which the carboxyl group is partially replaced with an alkyl ester group in order to control the reaction to obtain the intended properties may also be used:

Compound (1) 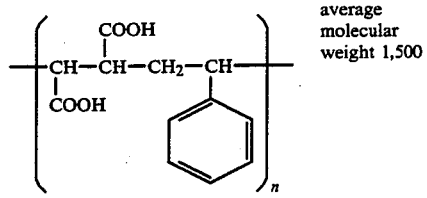 average molecular weight 1,500

Compound (2) 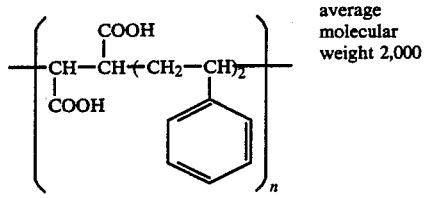 average molecular weight 2,000

Compound (3) 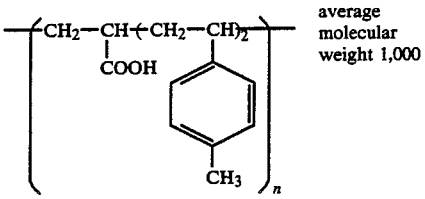 average molecular weight 1,000

Compound (4) 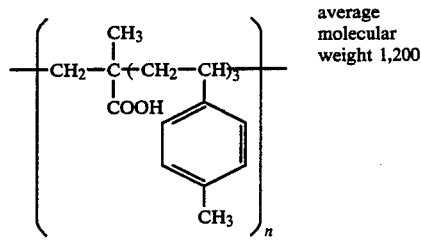 average molecular weight 1,200

Compound (5) 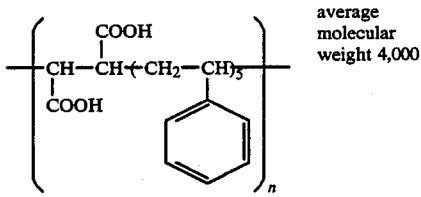 average molecular weight 4,000

These polybasic carboxylic acids (II) or their anhydrides or lower alkyl esters are contained in the acid component in an amount of preferably 0.05 to 70 molar %.

The unsaturated aliphatic hydrocarbon (IVa) having 2 to 21 carbon atoms includes, for example, olefins having 2 to 21 carbon atoms, such as ethylene, isobutylene, diisobtylene, cyclopentene, cyclohexene, dodecene and octadecene. Among them, those represented by the following general formula:

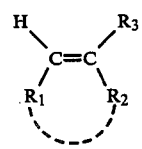

wherein $R_1$ and $R_3$ each represent a hydrogen atom or an alkyl group having 1 to 12 carbon atoms, $R_2$ represents an alkyl group having 1 to 12 carbon atoms and $R_1$ and $R_2$ may be connected with each other, are preferred.

The unsaturated carboxylic acid (IVb) includes, for example, maleic acid, fumaric acid, acrylic acid, methacrylic acid and itaconic acid. It preferably includes a compound of the formula:

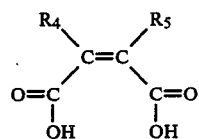

wherein $R_4$ and $R_5$ each represent a hydrogen atom or an alkyl group having 1 to 12 carbon atoms. They may be in the form of either their anhydrides or lower alkyl esters. The lower alkyl group herein indicates that the alkyl group in the alkyl ester has such a number of carbon atoms that it does not disturb the copolymerization of the compound of the formula (IVa) with of a compound of the formula (IVa) with a compound of the formula (IVb).

Examples of the polybasic carboxylic acid (IV) to use practically in the invention are shown below. The carboxyl group contained in each compound may be replaced by an alkyl ester group to adjust the physical properties of the resulting product as one desires.

Compound (1) 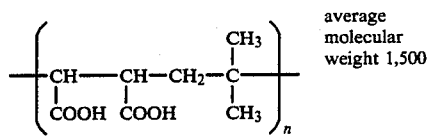 average molecular weight 1,500

Compound (2) a compound having an average molecular weight of 9,000 obtained by the addition polymerization of maleic acid with isobutylene in a ratio of 1:2, Compound (3) a compound having an average molecular weight of 700 obtained by the addition polymerization of maleic anhydride with 1-tetradecene in a ratio of 1:3, Compound (4) 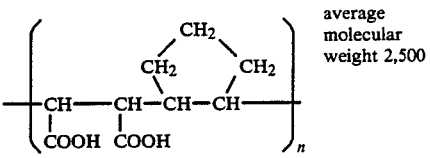 average molecular weight 2,500

Compound (5) 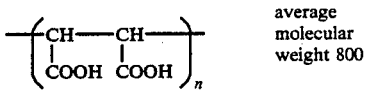 average molecular weight 800

The polybasic carboxylic acid (IV), an anhydride thereof and a lower alkyl ester thereof may be contained in the acid component (b) in an amount of 0.05 to 70 mol percent.

The acid component of the present invention may contain an alkyl- or alkenylsuccininc acid or the following general formula (III) or its anhydride or lower alkyl ester:

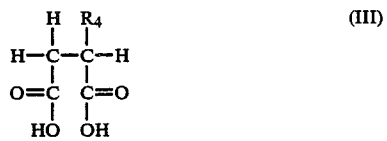 (III)

wherein $R_4$ represents an alkyl or alkenyl group having 4 to 18 carbon atoms.

Examples of the alkyl- or alkenylsuccinic acids include n-dodecenyl-, isododecenyl-, n-dodecyl-, isododecyl-, n-octyl-, n-octenyl- and n-butylsuccinic acids. By using the alkyl- or alkenylsuccinic acid, the minimum fixing temperature can be lowered without lowering the offset-causing temperature. When the amount of the alkyl- or alkeylsuccinic acid is insufficient, the intended effect cannot be obtained sufficiently and when it is excessive, Tg is lowered to cause caking of the toner and to make the control of the reaction difficult. Therefore, the amount of the compound is preferably 1 to 50 molar % based on the acid component. THe dibasic carboxylic acids other than the alkyl or alkenylsuccinic acids usable in the present invention include, for example, fumaric, maleic, succinic, adipic, suberic, azelaic, sebacic, terephthalic, isophthalic and 2,6-naphthalenedicarboxylic acids.

To further improve the fixability, (1) a liquid polybutadiene having a carboxylgroup in its free form or in the form of an acid anhydride or lower alkyl ester or a tetracarboxylic acid having an alkylene or alkenylene group may be incorporated in the developer composition as the acid component. Examples of preferred tetracaboxylic acids include:

(1) 4-neopentylidenyl-1,2,6,7-heptamnetetracarboxylic acid,
(2) 4-neopentyl-1,2,6,7-heptene(4)-tetracarboxylic acid,
(3) 3-methyl-4-heptenyl-1,2,5,6-hexanetetracarboxylic acid,
(4) 3-methyl-3-heptyl-5-methyl-1,2,6,7-heptene(4)-tetracarboxylic acid,
(5) 3-nonyl-4-methylidenyl-1,2,5,6-hexanetetracarboxylic acid,
(6) 3-decylidenyl-1,2,5,6-hexanetetracarboxylic acid,
(7) 3-nonyl-1,2,6,7-heptene(4)-tetracarboxylic acid,
(8) 3-decenyl-1,2,5,6-hexanetetracarboxylic acid,
(9) 3-butyl-3-ethylenyl-1,2,5,6-hexanetetracarboxylic acid,
(10) 3-methyl-4-butylidenyl-1,2,6,7-heptanetetracarboxylic acid,
(11) 3-methyl-4-butyl-1,2,6,7-heptene(4)-tetracarboxylic acid, and
(12) 3-methyl-5-octyl-1,2,6,7-heptene(4)-tetracarboxylic acid.

The binder resin obtained by the process of the present invention has a softening point (as determined by the ring-and-ball method according to ASTM E-28-51T) of preferably 90° to 180° C.

The binder resin obtained by the process of the present invention is used in the production of a toner for the electrostatic development by a usual process.

More particularly, a colorant including carbon black produced by thermal black, acetylene black, channel black, furnace black or lamp black process (in the production of a black toner); or copper phthalocyanine, monoazo pigment (C.I. Pigment Red 5, C.I. Pigment Orange 36 or C.I. Pigment Red 22), disazo pigment (C.I. Pigment Yellow 83), anthraquinone pigment (C.I. Pigment Blue 60), disazo dye (Solvent Red 19) or Rhodamine dye (Solvent Red 49) (in the production of a color toner) is added to the binder resin, and the mixture is thoroughly mixed in a ball mill or the like to obtain a homogeneous dispersion, which is kneaded by fusion in a kneader, cooled and pulverized to form a colored powder, i.e. a toner having an average particle diameter of 5 to 15$\mu$. The toner is blended with a magnetic powder such as an amorphous carrier, ferrit-coated carrier or spheroidally coated carrier in a suitable ratio to form a developer.

A fine magnetic powder may be incorporated in the tone to help meet the requirement of a developing mechanism or the quality of the image. Examples of such a powder include those of alloys and compounds containing a ferromagnetic element, such as ferrite and magnetite. The fine magnetic powder having an average particle diameter of 0.05 to 1$\mu$ may be dispersed in the binder resin in an amount of 30 to 70 wt.%.

The toner according to the present invention may further contain a known modifier such as an offset inhibitor or a fluidizing agent suitably without hindering the purposes of the present invention.

The following examples will further illustrate the present invention, but are not intended to limit the scope thereof.

EXAMPLE 1

3.5 kg of polyoxypropylene(2.2)-2,2-bis(4-hydroxyphenyl)propane, 1.04 kg of fumaric acid, 132 g of dodecenylsuccinic acid anhydride, 110 g of the above-mentioned compound (1) as the polybasic carboxylic acid (II) and 3 g of hydroquinone were placed in a 5 l four-necked glass flask. Then, the flask was provided with a thermometer, a stainless steel stirrer, a dehydration tube having a reflux condenser and a nitrogen inlet tube and the reaction was carried out under stirring at 200° C. in a nitrogen stream in an electrically heated mantle. The degree of polymerization was traced from the softening point determined according to ASTM E 28-51T and the reaction was terminated when the softening point reached 125° C. The obtained resin was in the form of a pale yellow solid having a glass transition temperature determined with a DSC (differential scanning calorimeter) of 59° C.

90 parts by weight of the resin obtained as above was mixed with 10 parts by weight of carbon black (Regal 400 R; a product of Cabot Co.) in a ball mill and the mixture was kneaded, pulverized and classified to obtain a toner having an average particle diameter of 12.5$\mu$. The obtained toner was mixed with a powdery iron carrier (EFV 200/300; a product of Nihon Teppun Co.). The electric charge thereof determined with a blow-off charge determination device was −23 $\mu$c/g.

50 g of the obtained toner was placed in a polymer bottle and left to stand at 50° C. for 24 h. No caking was observed at all.

91 g of the toner was mixed with 1209 g of the same powdery iron carrier as above to form a developer. An image was formed with the obtained developer by using a commercially available electrophotographic copier (in which amorphous selenium was used as the sensitizer, the speed of the roller was 255 mm/sec, the heat roller temperature in the fixing device was variable and an oil applicator had been removed) to obtain a clear image free of scumming, blur or dropout in the solid part. The fixing temperature of the fixing device was controlled to 140° to 220° C. and the fixing property of the image and offset property were examined to reveal that the image was fixed sufficiently at 142° C. and no offset was recognized. After forming 50,000 copies, the clear image could still be obtained and neither fogging nor dropout was recognized in the solid part.

The minimum fixing temperature was determined as follows: a load of 500 g was applied to a sand-containing rubber eraser having a size of the bottom of 15 mm×7.5 mm and an image fixed by passing through the fixing device was rubbed back and forth five times with the eraser. The optical reflection density of the sample was determined with a reflection densitometer (a product of Macbeth Co.) before and after the rubbing. The temperature of the fixing roller determined when the fixing rate as defined below exceeded 70% was defined as the minimum fixing temperature:

$$\text{fixing rate} = \frac{\text{optical density of image after the rubbing}}{\text{optical density of image before the rubbing}}$$

The optical density of the image before the rubbing was 0.50.

EXAMPLE 2

1.58 kg of polyoxyethylene(2)-2,2-bis(4-hydroxyphenyl)propane, 1.78 kg of polyoxypropylene-(2.2)-2,2-bis(4-hydroxyphenyl)propane, 830 g of terephthalic acid, 464 g of fumaric acid, 132 g of dodecenylsuccinic anhydride, 162 g of the above-mentioned compound (2) as the polybasic carboxylic acid (II) and 3 g of hydroquinone were placed in the same device as in Example 1 and the same procedure as in Example 1 was repeated. The reaction was terminated when the softening point reached 125° C. The obtained resin was in the form of a pale yellow solid having a glass transition temperature of 60° C.

A toner was prepared from the obtained resin and it was blended with the powdery iron carrier to form a developer in the same manner as in Example 1.

EXAMPLE 3

2848 g of polyoxypropylene(2.2)-2,2-bis(4-hydroxyphenyl)propane, 208 g of 2,2-dimethyl-1,3-propanediol, 928 g of fumaric acid, 264 g of dodecenylsuccinic anhydride, 616.5 g of the above-mentioned compound (3) as the polybasic carboxylic acid (II) and 3 g of hydroquinone were placed in the same device as in Example 1 and then the same procedure as in Example 1 was repeated. The reaction was terminated when the softening point reached 123° C. The obtained resin was in the form of a pale yellow solid having a glass transition temperature of 62° C.

A toner was prepared from the obtained resin and it was blended with the powdery iron carrier to form a developer in the same manner as in Example 1.

EXAMPLE 4

3560 g of polyoxypropylene(2.2)-2,2-bis(4-hydroxyphenyl)propane, 1245 g of isophthalic acid, 104 g of octylsuccinic anhydride, 1717 g of the above-mentioned compound (4) as the polybasic carboxylic acid (II) and 3 g of hydroquinone were placed in the same device as in Example 1 and the same procedure as in Example 1 was repeated. The reaction was terminated when the softening point reached 125° C. The obtained resin was in the form of a pale yellow solid having a glass transition temperature of 65° C.

A toner was prepared from the obtained resin and it was blended with the powdery iron carrier to form a developer in the same manner as in Example 1.

COMPARATIVE EXAMPLE 1

The same procedure as in Example 1 was repeated except that the compound (1) was not used and the amount of fumaric acid was increased to 1102 g so as to control the ratio of the carboxyl groups to the hydroxyl groups and the reaction was terminated when the softening point reached 125° C. The obtained resin was in the form of a pale yellow solid having a glass transition temperature of 58° C.

A toner was prepared from the obtained resin and it was blended with the powdery iron carrier to form a developer in the same manner as in Example 1.

COMPARATIVE EXAMPLE 2

The same procedure as in Example 1 was repeated except that the compound (1) was replaced with 110 g of trimellitic acid and the reaction was terminated when the softening point reached 125° C. The obtained resin was in the form of a pale yellow solid having a glass transition temperature of 59° C.

A toner was prepared from the obtained resin and it was blended with the powdery iron carrier to form a developer in the same manner as in Example 1.

An image was formed in the same manner as in Example 1 except that the developers obtained in Examples 2 to 4 and Comparative Examples 1 and 2 were used. The results are shown in Table 1. The density of the initial image developed in each test was determined to be suitable.

EXAMPLE 5

A toner was prepared in the same manner as in Example 1 except that the carbon black was replaced with a copper phthalocyanine pigment (C.I. Pigment No. Blue 15:3) and a developer was prepared therefrom. Then a clear, blue image was formed. The formed image was unchanged after a storage in a polyvinyl chloride file.

TABLE 1

| | Minimum fixing temp. (°C.) | Hot offset-causing temp. (°C.) | Print resistance test | Pulverizability* | Storage stability** | Filing stability to polyvinyl chloride sheets*** |
|---|---|---|---|---|---|---|
| Ex. 1 | 142 | not caused | good | 1.00 | no change observed | no change observed |
| Ex. 2 | 135 | " | " | 1.20 | " | " |
| Ex. 3 | 145 | " | " | 1.15 | " | " |
| Ex. 4 | 155 | " | " | 1.10 | " | " |
| Comp. Ex. 1 | 140 | caused at 160° C. | image density reduced after the production of 10,000 copies. | 0.95 | " | sample adhered to the file and the image became glossy. |
| Comp. | 170 | not caused | good | 0.53 | " | no change observed |

TABLE 1-continued

| | Minimum fixing temp. (°C.) | Hot offset-causing temp. (°C.) | Print resistance test | Pulverizability* | Storage stability** | Filing stability to polyvinyl chloride sheets*** |
|---|---|---|---|---|---|---|
| Ex. 2 | | | | | | |

*Pulverizability: as compared with the production per unit time (taken as 1.00) obtained in Example 1,
**Storage stability: formation of cake or not after being left to stand at 50° C. for 24 h, and
***Filing stability to polyvinyl chloride sheets: The image carrying sample was filed between non-rigid polyvinyl chloride sheets and allowed to stand while they were in contact sufficiently at 35° C. for one week and the results were judged macroscopically.

EXAMPLE 6

3.5 kg of polyoxypropylene(2.2)-2,2-bis(4-hydroxyphenyl)propane, 1.04 kg of fumaric acid, 132 g of dodecenylsuccinic acid anhydride, 105 g of the above-mentioned compound (1) as the polybasic carboxylic acid (II) and 3 g of hydroquinone were placed in a 5 l four-necked glass flask. Then, the flask was provided with a thermometer, a stainless steel stirrer, a dehydration tube having a reflux condenser and a nitrogen inlet tube. The reaction was carried out under stirring at 200° C. in a nitrogen stream in an electrically heated mantle. The degree of polymerization was traced from the softening point determined according to ASTM E 28-51T and the reaction was terminated when the softening point reached 128° C. The obtained resin was in the form of a pale yellow solid having a glass transition temperature determined with a DSC (differential scanning calorimeter) of 58° C.

90 parts by weight of the resin obtained as above was mixed with 10 parts by weight of carbon black (Regal 400 R; a product of Cabot Co.) in a ball mill and the mixture was kneaded, pulverized and classified to obtain a toner having an average particle diameter of 12.5μ. The obtained toner was mixed with a powdery iron carrier (EFV 200/300; a product of Nihon Teppun Co.). The electric charge thereof determined with a blow-off charge determination device was −23 μc/g.

50 g of the obtained toner was placed in a polymer bottle and left to stand at 50° C. for 24 h. No caking was observed at all.

91 g of the toner was mixed with 1209 g of the same powdery iron carrier as above to form a developer. An image was formed with the obtained developer by using a commercially available electrophotographic copier (in which amorphous selenium was used as the sensitizer, the speed of the roller was 255 mm/sec, the heat roller temperature in the fixing device was variable and an oil applicator had been removed) to obtain a clear image free of scumming, blur or dropout in the solid part. The fixing temperature of the fixing device was controlled to 140° to 220° C. and the fixing property of the image and offset property were examined to reveal that the image was fixed sufficiently at 143° C. and no offset was recognized. After forming 50,000 copies, the clear image could still be obtained and neither fogging nor dropout was recognized in the solid part.

EXAMPLE 7

1.58 kg of polyoxyethylene(2)-2,2-bis(4-hydroxyphenyl)propane, 1.78 kg of polyoxypropylene(2.2)-2,2-bis(4-hydroxyphenyl)propane, 830 g of terephthalic acid, 464 g of fumaric acid, 132 g of dodecenylsuccinic anhydride, 123 g of the above-mentioned compound (2) as the polybasic carboxylic acid (II) and 3 g of hydroquinone were placed in the same device as in Example 6 and the same procedure as in Example 6 was repeated. The reaction was terminated when the softening point reeached 122° C. The obtained resin was in the form of a pale yellow solid having a glass transition temperature of 58° C.

A toner was prepared from the obtained resin and it was blended with the powdery iron carrier to form a developer in the same manner as in Example 6.

EXAMPLE 8

2848 g of polyoxypropylene(2.2)-2,2-bis(4-hydroxyphenyl)propane, 208 g of 2,2-dimethyl-1,3-propanedol, 928 g of fumaric acid, 264 g of dodecenylsuccinic anhydride, 1825 g of the above-mentioned compound (3) as the polybasic carboxylic acid (II) and 3 g of hydroquinone were placed in the same device as in Example 6 and then the same procedure as in Example 6 was repeated. The reaction was terminated when the softening point reached 124° C. The obtained resin was in the form of a pale yellow solid having a glass transistion temperature of 60° C.

A toner was prepared from the obtained resin and it was blended with the powdery iron carrier to form a developer in the same manner as in Example 6.

EXAMPLE 9

3560 g of polyoxypropylene(2.2)-2,2-bis(4-hydroxyphenyl)propane, 1245g of isophthalic acid, 104 g of octylsuccinic anhydride, 2012 g of the above-mentioned compound (4) as the polybasic carboxylic acid (II) and 3 g of hydroquinone were placed in the same device as in Example 6 and the same procedure as in Example 6 was repeated. The reaction was terminated when the softening point reached 122° C. The obtained resin was in the form of a pale yellow solid having a glass transition temperature of 64° C.

A toner was prepared from the obtained resin and it was blended with the powdery iron carrier to form a developer in the same manner as in Example 6.

An image was formed in the same manner as in Example 6, except that each developer obtained in Examples 2 to 4 was used. The results are shown in Table 2.

EXAMPLE 10

A toner was prepared in the same manner as in Example 6, except that carbon black was replaced by a pigment of copper phthalocyanine (C.I. Pigment No. Blue 15:3), and a developer was prepared therefrom. Then a clear, blue image was formed. The formed image was unchanged after the storage in a polyvinyl chloride file.

TABLE 2

|  | Minimum fixing temp. (°C.) | Hot offset-causing temp. (°C.) | Print resistance test | Pulverizability* | Storage stability** | Filing resistance to polyvinyl chloride sheets*** |
| --- | --- | --- | --- | --- | --- | --- |
| Ex. 6 | 143 | not caused | good | 1.00 | no change observed | no change observed |
| Ex. 7 | 140 | " | " | 1.10 | " | " |
| Ex. 8 | 135 | " | " | 1.20 | " | " |
| Ex. 9 | 135 | " | " | 1.20 | " | " |

*Pulverizability: as compared with the production per unit time (taken as 1.00) obtained in Example 1,
**Storage stability: formation of cake or not after being left to stand at 50° C. for 24 h, and
***Filing stability to polyvinyl chloride sheets: The image-carrying sample was filed between non-rigid polyvinyl chloride sheets and allowed to stand while they were in contact sufficiently at 35° C. for one week and the results were judged macroscopically.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The embodiments of the invention in which an exclusive property or privilege is claimed are defined as follows:

1. A toner composition, which comprises:
   a polyester produced by a process of copolycondensing:
   (a) a diol component of the formula (I):

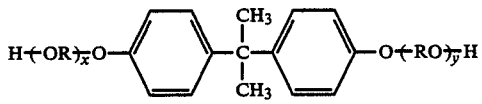

wherein R is an ethylene or propylene group and x and y are each an integer of at least 1, the total sum of x and y being 2 to 7 on the average, with
   (b) an acid component of a polycarboxylic acid, an anhydride thereof or a lower alkyl ester thereof, said acid component containing
   (II) a polycarboxylic copolymer of a styrene compound selected from alpha-methylstyrene and a compound of the formula (IIa):

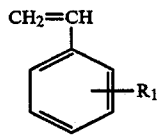

wherein $R^1$ is hydrogen or a hydrocarbon group having 1 to 3 carbon atoms, and a carboxylic group-containing vinyl monomer of the formula (IIb), an anhydride thereof or a lower alkyl ester thereof:

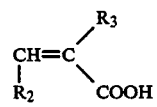

wherein $R^2$ and $R^3$ are each hydrogen, methyl or a carboxyl group; or
   (III) a copolymer of an unsaturated aliphatic hydrocarbon (IIIa) having 2 to 21 carbon atoms and an unsaturated carboxylic acid (IIIb); or
   (IV) a polymer or copolymer of an unsaturated carboxylic acid (IIIb); and a coloring matter.

2. A toner composition as claimed in claim 1, which further comprises 30 to 70 percent by weight of a magnetic powder having an average particle size of 0.05 to 1 micron.

3. The composition of claim 1, wherein the lower alkyl group has 1 to 4 carbon atoms.

4. The composition of claim 1, wherein the diol component (a) is selected from the group consisting of polyoxypropylene(2.2)-2,2-bis(4-hydroxyphenyl)propane, polyoxypropylene-(3.3)-2,2-bis(4-hydroxyphenyl)propane, polyoxyethylene(2.0)-2,2-bis(4-hydroxyphenyl)propane, polyoxypropylene(2.0)-polyoxyethylene(2.0)-2,2-bis(4-hydroxyphenyl)propane and polyoxypropylene(6)-2,2-bis(4-hydroxyphenyl)propane.

5. The composition of claim 1, wherein the compound of the formula (IIa) is selected from the group consisting of styrene, methylstyrene, ethylstyrene, and propylstyrene.

6. The composition of claim 1, wherein the compound of the formula (IIb) is selected from the group consisting of maleic acid, fumaric acid, acrylic acid, methacrylic acid, and itaconic acid.

7. The composition of claim 1, wherein the compound (IIa) is present in an amount of 1 to 5 mole percent of the compound (IIb).

8. The composition of claim 1, wherein the compound II is contained in the acid component in an amount of preferably 0.05 to 70% by mole.

9. The composition of claim 1, wherein the unsaturated aliphatic hydrocarbon (IIIa) is selected from the group consisting of ethylene, isobutylene, diisobutylene, cyclopentene, cyclohexane, dodecene, and octadecene.

10. The composition of claim 1, wherein the unsaturated carboxylic acid (IIIb) is selected from the group consisting of maleic acid, fumaric acid, acrylic acid, methacrylic acid, and itaconic acid.

11. The composition of claim 1, wherein the compound (III) is contained in the acid component (b) in an amount of 0.05 to 70% by mole.

12. The composition of claim 1, wherein the acid component of the present invention further includes an alkyl or alkenylsuccinic acid of the following formula or its anhydride or lower alkyl ester:

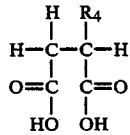

wherein R$_4$ is an alkyl or alkenyl group having 4 to 18 carbon atoms.

13. The composition of claim 12, wherein the alkyl or alkenylsuccinic acid is present in an amount of 1 to 50% by mole based on the amount of the acid component.

14. A toner composition, which comprises:
a polyester comprising
(a) a diol component of the formula (I):

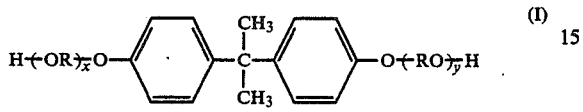 (I)

wherein R is an ethylene or propylene group and x and y are each an integer of at least 1, the sum of x and y being 2 to 7 on the average; and (b) an acid component of a polycarboxylic acid, an anhydride thereof or a lower alkyl ester thereof, said acid component containing (II) a polycarboxylic copolymer of a styrene compound selected from alpha-methylstyrene and a compound of the formula (IIa):

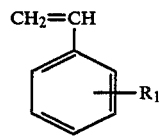 (IIa)

wherein R$^1$ is hydrogen or a hydrocarbon group having 1 to 3 carbon atoms,
and a carboxylic group-containing vinyl monomer of the formula (IIb), an anhydride thereof or a lower alkyl ester thereof:

 (IIb)

wherein R$^2$ and R$^3$ are each hydrogen, methyl or a carboxyl group; or (III) a copolymer of an unsaturated aliphatic hydrocarbon (IIIa) having 2 to 21 carbon atoms and an unsaturated carboxylic acid (IIIb); or (IV) a polymer or copolymer of an unsaturated carboxylic acid (IIIb); and a coloring matter.

15. The composition of claim 14, which further comprises 30 to 70 percent by weight of a magnetic powder having an average particle size of 0.05 to 1 micron.

* * * * *